No. 856,077. PATENTED JUNE 4, 1907.
H. MALICK.
INK WELL.
APPLICATION FILED JAN. 15, 1907.
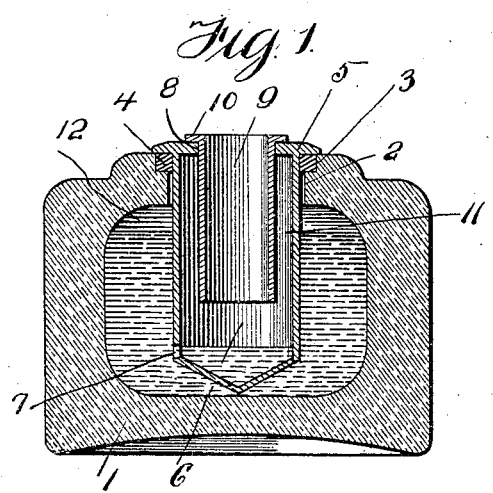
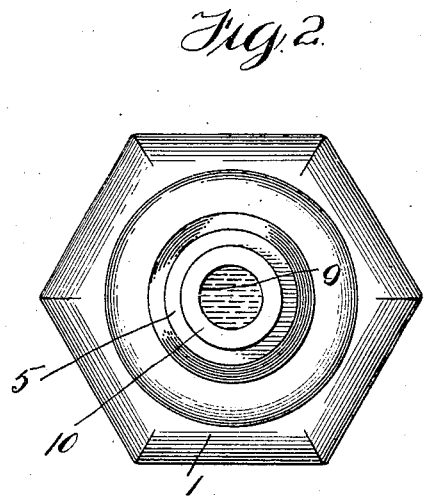
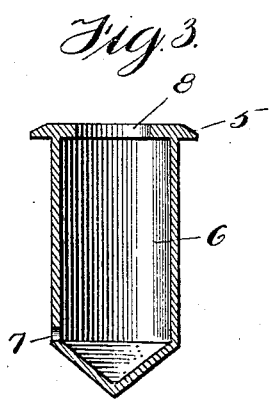
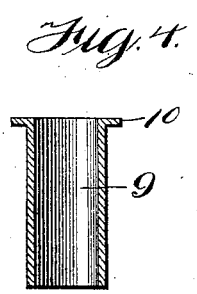
WITNESSES:
Samuel Payne
R. H. Butler
INVENTOR
Henry Malick
BY H. C. Everett
Attorneys

UNITED STATES PATENT OFFICE.

HENRY MALICK, OF BELMONT, WEST VIRGINIA.

INK-WELL.

No. 856,077.  Specification of Letters Patent.  Patented June 4, 1907.

Application filed January 15, 1907. Serial No. 352,357.

*To all whom it may concern:*

Be it known that I, HENRY MALICK, a citizen of the United States of America, residing at Belmont, in the county of Pleasant and State of West Virginia, have invented certain new and useful Improvements in Ink-Wells, of which the following is a specification, reference being had therein to the accompanying drawings.

This invention relates to certain new and useful improvements in ink wells, and the primary object of this invention is the provision of novel means in connection with an ink well for preventing the contents of a well from being spilled, should the well be accidentally upset or tilted.

Another object of this invention is to provide a novel attachment for ink wells, for regulating the amount of ink in which a pen or writing instrument is dipped.

A further object of this invention is the provision of novel means in connection with an ink well for preventing the evaporation of the contents of said well.

A further object of this invention is to provide a simple and inexpensive ink well which will be strong and durable and comparatively inexpensive to manufacture.

With these and other objects in view which will more readily appear as the invention is better understood, the same consists in the novel construction, combination and arrangement of parts to be hereinafter more fully described and then specifically pointed out in the appended claims.

Referring to the drawing forming part of this specification, like numerals of reference designate corresponding parts throughout the several views, in which:

Figure 1 is a vertical sectional view of my improved ink well, Fig. 2 is a plan of the same, Fig. 3 is a vertical sectional view of a portion of my improved well, and Fig. 4 is a similar view of another portion of the device.

In the embodiment of the invention shown, 1 designates a receptacle, preferably made of a material of a vitreous nature, such as glass, porcelain, or the like. The said receptacle 1 has its top provided with a central opening 2, and said top is also provided around the opening 2 with a groove, forming an annular shoulder 3 which receives a gasket 4.

Extending into the ink chamber of the receptacle 1, through the central opening 2 in the top of said receptacle, is a dip-well 6 the lower end of which is substantially cone-shaped, and has its apex resting on the bottom of the ink chamber in the receptacle 1. The said dip-well is provided in its upper end with a central aperture 8 and an annular flange 5 which rests upon the gasket 4 seated on shoulder 3 of the receptacle 1. The said dip-well is provided near its lower end, in the side wall thereof, with an aperture 7, the said aperture being preferably located at the lower end of the vertical portion of the side wall of said dip-well.

Mounted in the dip-well is a tube 9 having an annular projecting flange 10 on its upper end which rests upon the cap or upper end of the dip-well, and supports said tube. This tube 9 extends into the dip-well for a considerable distance, and thus forms an annular space 11 within the dip-well into which the ink may flow that is contained within the dip-well, when the receptacle is upset or tilted to an undue angle.

In practice, the ink chamber 12 in the receptacle 1 is but partially filled, so that should the ink well be upset, the level of the ink, even if the well has just been filled, will be approximately at the aperture 7, and only a very small quantity of the ink would flow into the dip well 6 upon the inversion of the ink well.

The aperture or opening 7 provides for a supply of ink being fed into the dip-well so long as a sufficient supply is in the ink chamber 12. The pen is inserted through the tube 9 and the conical lower end of the dip-well provides a pool of ink of sufficient depth to give the desired quantity onto the pen point with each dipping, and all the ink that is subject to the action of the atmosphere is that amount contained within the dip-well, which prevents rapid evaporation which takes place where a large body of ink is open to the atmosphere.

The dip-well 6 and tube 9 are preferably constructed of a suitable non-corrosive material, and may be readily adapted to the ordinary ink well.

What I claim and desire to secure by Letters Patent, is:—

1. In an ink well the combination with a receptacle, of a dip-well extending into the receptacle having a conical lower end resting on the bottom of the receptacle and having a feed opening in its side wall above the conical end, and a tube extending into the dip-well having an annular flange on its upper end resting on the dip-well.

2. In combination with a receptacle a dip-well centrally mounted in the receptacle having a closed lower end cone-shaped in form with its apex resting upon the bottom of the receptacle, and having an opening in its side above said cone-shaped end, an annular flange on the upper end of the dip-well resting on the top of said receptacle, and a tube extending into the receptacle and having an annular flange on its upper end resting on the top of said dip-well substantially as described.

In testimony whereof I affix my signature in the presence of two witnesses.

HENRY MALICK.

Witnesses:
 MAX H. SROLOVITZ,
 A. J. TRIGG.